United States Patent
Fujisawa

(10) Patent No.: US 12,485,586 B2
(45) Date of Patent: Dec. 2, 2025

(54) MOLD CLAMPING DEVICE

(71) Applicant: Yamaha Robotics Co., Ltd., Tokyo (JP)

(72) Inventor: Masahiko Fujisawa, Nagano (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 0 days.

(21) Appl. No.: 18/690,738

(22) PCT Filed: Nov. 26, 2021

(86) PCT No.: PCT/JP2021/043344
§ 371 (c)(1),
(2) Date: Mar. 10, 2024

(87) PCT Pub. No.: WO2023/095276
PCT Pub. Date: Jun. 1, 2023

(65) Prior Publication Data
US 2025/0162204 A1    May 22, 2025

(51) Int. Cl.
*B29C 33/22* (2006.01)
*B29C 33/20* (2006.01)
*H01L 21/67* (2006.01)

(52) U.S. Cl.
CPC .............. *B29C 33/22* (2013.01); *B29C 33/20* (2013.01)

(58) Field of Classification Search
CPC ................................ B29C 33/20; B29C 33/22
See application file for complete search history.

(56) References Cited

U.S. PATENT DOCUMENTS 10,960,583 B2 * 3/2021 Ho ..................... B29C 45/14819
11,865,756 B2 * 1/2024 Hamaguchi ............. B29C 45/68
(Continued)

FOREIGN PATENT DOCUMENTS

JP          H0780902          3/1995
JP          H07186222         7/1995
(Continued)

OTHER PUBLICATIONS

"International Search Report (Form PCT/ISA/210) of PCT/JP2021/043344", mailed on Dec. 28, 2021, with English translation thereof, pp. 1-4.
(Continued)

*Primary Examiner* — Atul P. Khare
(74) *Attorney, Agent, or Firm* — JCIPRNET

(57) ABSTRACT

A mold clamping device is provided with a movable platen that moves along a tie bar; a driving mechanism having multiple raising-lowering mechanisms, including a first raising-lowering mechanism and a second raising-lowering mechanism, and configured to be capable of introducing a difference so that a first portion of the movable platen corresponding to the first raising-lowering mechanism is set at a higher position or a lower position than a second portion of the movable platen corresponding to the second raising-lowering mechanism, the driving mechanism moving the movable platen; and a connecting structure, connecting the driving mechanism to the movable platen. The connecting structure is configured as a stopper that restricts movement of the movable platen so that the difference does not become greater than a prescribed value.

4 Claims, 3 Drawing Sheets

(56) References Cited

U.S. PATENT DOCUMENTS

2023/0382022 A1* 11/2023 Fujisawa ................ B29C 43/18
2023/0405900 A1* 12/2023 Senga ................... B29C 45/661
2024/0416561 A1* 12/2024 Fujisawa ................ B29C 33/20

FOREIGN PATENT DOCUMENTS

| | | | | |
|---|---|---|---|---|
| JP | 2004330552 A | * | 11/2004 | |
| JP | 2006312280 | | 11/2006 | |
| JP | 2007324377 | | 12/2007 | |
| JP | 2008087408 | | 4/2008 | |
| JP | 2010083085 | | 4/2010 | |
| KR | 101622136 B1 | * | 5/2016 | ............. B29C 45/03 |

OTHER PUBLICATIONS

"Office Action of Taiwan Counterpart Application", issued on Mar. 2, 2023, with English translation thereof, pp. 1-13.
"Rejection Decision of Taiwan Counterpart Application", issued on Jul. 19, 2023, with English translation thereof, pp. 1-12.

* cited by examiner

MOLD CLAMPING DEVICE

CROSS-REFERENCE TO RELATED APPLICATION

This application is a 371 application of the International PCT application serial no. PCT/JP2021/043344, filed on Nov. 26, 2021. The entirety of each of the above-mentioned patent application is hereby incorporated by reference herein and made a part of this specification.

TECHNICAL FIELD

The present invention relates to a mold clamping device provided with multiple raising-lowering mechanisms.

RELATED ART

There is a demand to reduce the total thickness variation (TTV), which is the difference between the maximum and minimum thickness of the resin-sealed product, as much as possible. To reduce the TTV, the distance between the fixed platen and movable platen must be adjusted with high precision during mold clamping so that the upper mold and lower mold are parallel. For example, Patent Documents 1 and 2 propose a mold clamping device that is provided with multiple raising-lowering mechanisms, and the height of the movable platen can be adjusted as desired for each part corresponding to each raising-lowering mechanism.

PRIOR-ART DOCUMENTS

Patent Documents

[Patent Document 1] Japanese Patent Application Laid-Open (JP-A) No. 2007-324377.
[Patent Document 2] Japanese Patent Application Laid-Open (JP-A) No. 2008-087408.

SUMMARY OF THE INVENTION

Problems to be Solved by the Invention

However, since the clearance between the movable platen and the tie bar that guides the elevation is small, if the height difference between the raising-lowering mechanisms is too large, the movable platen may tilt excessively and damage the tie bar. Thus, the present invention aims to provide a mold clamping device capable of preventing in advance the movable platen from damaging the tie bar.

Means for Solving the Problems

The mold clamping device in one aspect of the present invention includes: a movable platen that moves along a tie bar; a driving mechanism having multiple raising-lowering mechanisms, including a first raising-lowering mechanism and a second raising-lowering mechanism, and configured to be capable of introducing a difference so that a first portion of the movable platen corresponding to the first raising-lowering mechanism is set at a higher position or a lower position than a second portion of the movable platen corresponding to the second raising-lowering mechanism, the driving mechanism moving the movable platen; and a connecting structure, connecting the driving mechanism to the movable platen. The connecting structure is configured as a stopper that restricts movement of the movable platen so that the difference does not become greater than a prescribed value.

According to this aspect, the connecting structure restricts the movement of the movable platen even if the difference exceeds the prescribed value. Thus, it is possible to prevent in advance the tie bar from being damaged due to excessive tilting of the movable platen.

In the above-mentioned aspect, the connecting structure may include multiple connecting tools attached to the first raising-lowering mechanism.

According to this aspect, stress may be distributed to multiple connecting structures in each of the raising-lowering mechanisms. For example, it is suitable for raising-lowering mechanisms such as ball screws that generate a large rotational load around the shaft.

In the above-mentioned aspect, each of the connecting tools may configure a free shank structure having a movable region of the prescribed value.

According to this aspect, it is possible to restrict the movement of the movable platen so that the difference does not become greater than a prescribed value using a simple configuration that is easy to obtain.

In the above-mentioned aspect, the movable platen may be configured to be able to smoothly slide on a surface of the tie bar in a state in which the difference is equal to the prescribed value.

According to this aspect, in the case that the difference is less than or equal to the prescribed value, by adding a correction value for the difference, all the raising-lowering mechanisms may be driven at a constant speed while the movable platen is tilted, and operations such as mold closing and mold opening may be performed.

In the above-mentioned aspect, the driving mechanism may include four raising-lowering mechanisms.

According to this aspect, the raising-lowering mechanisms including the four raising-lowering mechanisms may be configured so as to be equidistant from each of the four tie bars to the nearest raising-lowering mechanism. The movable platen may be moved by transmitting force to each part in a well-balanced manner.

Effects of the Invention

According to the present invention, a mold clamping device capable of preventing in advance the movable platen from damaging the tie bar is provided.

DESCRIPTION OF THE EMBODIMENTS

Figure 1:
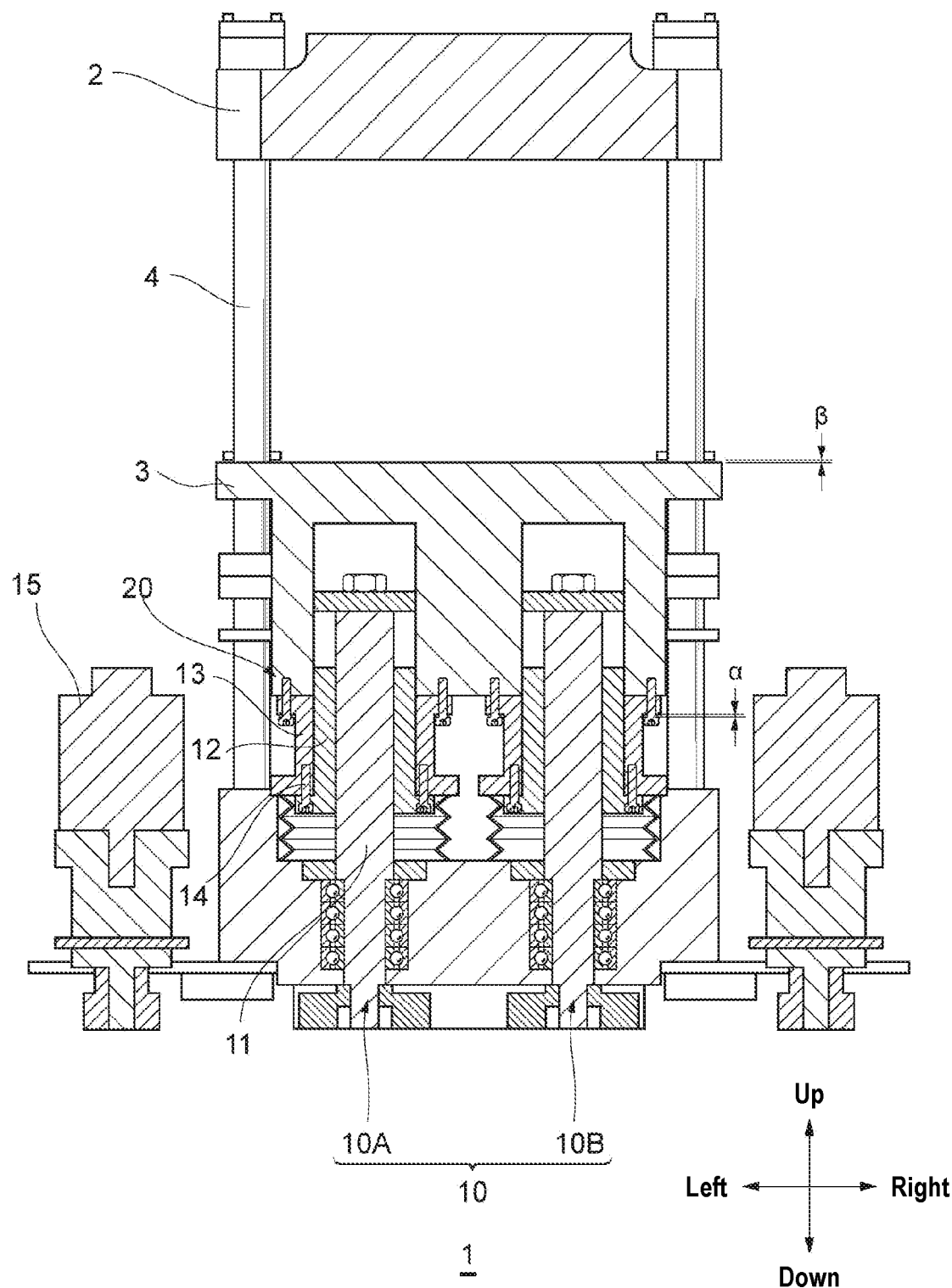
FIG. 1 is a cross-sectional view showing a mold clamping device in one embodiment of the present invention.

An exemplary embodiment of the present invention is described with reference to the drawings. In addition, in each figure, those with the same reference numerals have the same or similar configurations. One embodiment of the present invention is a mold clamping device 1 that clamps upper and lower molds in compression molding or transfer molding. By attaching an upper mold and a lower mold between the fixed platen 2 and the movable platen 3, a resin-sealing device for sealing semiconductor chips and the like with resin may be constructed. The present invention is described in detail below with reference to the drawings.

FIG. 1 is a cross-sectional view showing a mold clamping device 1 in one embodiment of the present invention, and a cross-sectional view taken along a plane passing through the center of the shaft portion 11 of the first and second raising-lowering mechanisms 10A and 10B described later. As shown in FIG. 1, the mold clamping device includes: a cylindrical tie bar 4 extending up and down, a fixed platen (also referred to as a "fixed board") 2 fixed to the end portion of the tie bar 4, a movable platen (also referred to as a "movable board") 3 that moves up and down along the tie bar 4, a driving mechanism 10 that moves the movable platen 3 up and down, a connecting structure 20 that connects the driving mechanism 10 to the movable platen 3, etc.

The driving mechanism 10 includes multiple raising-lowering mechanisms (10A, 10B, . . . ) including the first and second raising-lowering mechanisms 10A, 10B. In the illustrated example, although the fixed platen 2 is provided on the upper side and the movable platen 3 is provided on the lower side, the fixed platen 2 may be provided on the lower side and the movable platen 3 may be provided on the upper side. Each of the raising-lowering mechanisms 10A, 10B, . . . includes, for example, a ball screw (11, 12, 13, 14), a motor 15, and a transmission mechanism (not shown).

Although not shown, the transmission mechanism includes, for example, a speed reducer, a belt, and a pulley. The ball screw includes a shaft portion 11, a nut 12, a ring 13, and a tightening screw 14. The shaft portion 11 extends parallel to the extension direction of the tie bar 4 and is rotationally driven by a servo-controlled motor 15 via a transmission mechanism. When the shaft portion 11 rotates, the nut 12 moves linearly in the up and down direction. The ring 13 is fixed to the nut 12 with multiple tightening screws 14.

Figure 2:
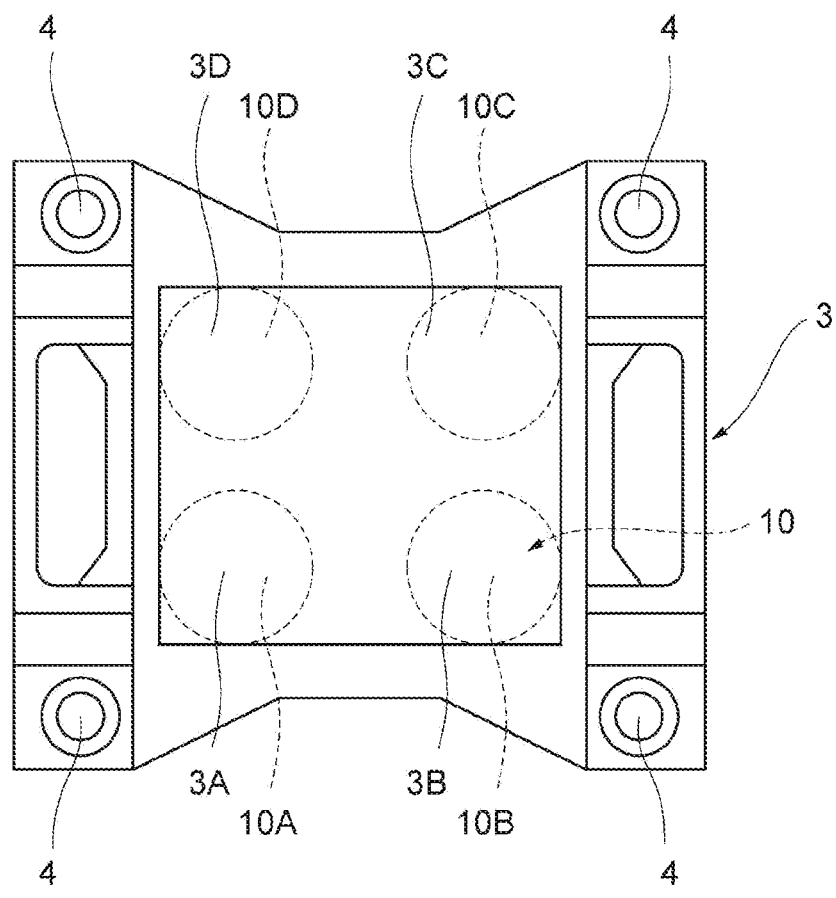
FIG. 2 is a plan view schematically showing the movable platen shown in FIG. 1.
Figure 2:
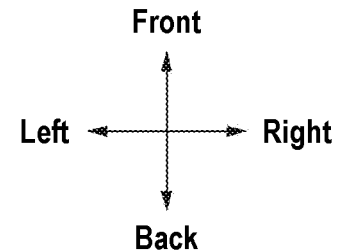

The mold clamping device 1 introduces a difference $\beta$ so that a first portion 3A corresponding to the first raising-lowering mechanism 10A (as shown in FIG. 2) is set at a higher position or a lower position than a second portion 3B corresponding to the second raising-lowering mechanism 10B (as shown in FIG. 2) and is capable of moving the movable platen 3. These raising-lowering mechanisms (10A, 10B, . . . ) that work together to move the movable platen 3 up and down are collectively referred to as a driving mechanism 10.

FIG. 2 is a plan view schematically showing the movable platen 3 shown in FIG. 1. In the illustrated example, the driving mechanism 10 of the mold clamping device 1 includes four raising-lowering mechanisms 10A, 10B, 10C, and 10D. The driving mechanism 10 may be configured with three or less raising-lowering mechanisms, or the driving mechanism 10 may be configured with five or more raising-lowering mechanisms. Each raising-lowering mechanism 10A, 10B, 10C, 10D presses a corresponding portion 3A, 3B, 3C, 3D positioned directly above that raising-lowering mechanism.

In addition, in the illustrated example, although the first and second raising-lowering mechanisms 10A and 10B among the first to fourth raising-lowering mechanisms 10A, 10B, 10C, and 10D are aligned left to right when viewed from the front, the first and second raising-lowering mechanisms 10A and 10B may be aligned front to back, and the first and second raising-lowering mechanisms 10A and 10B may be aligned diagonally (on the diagonal of the substantially rectangular movable platen 3). In other words, the difference $\beta$, which is the height difference between the first portion 3A and the second portion 3B of the movable platen 3, is not limited to the height difference between the left and right sides in the movable platen 3, and it may be a height difference between the front and back sides or a height difference between diagonals.

Figure 3:
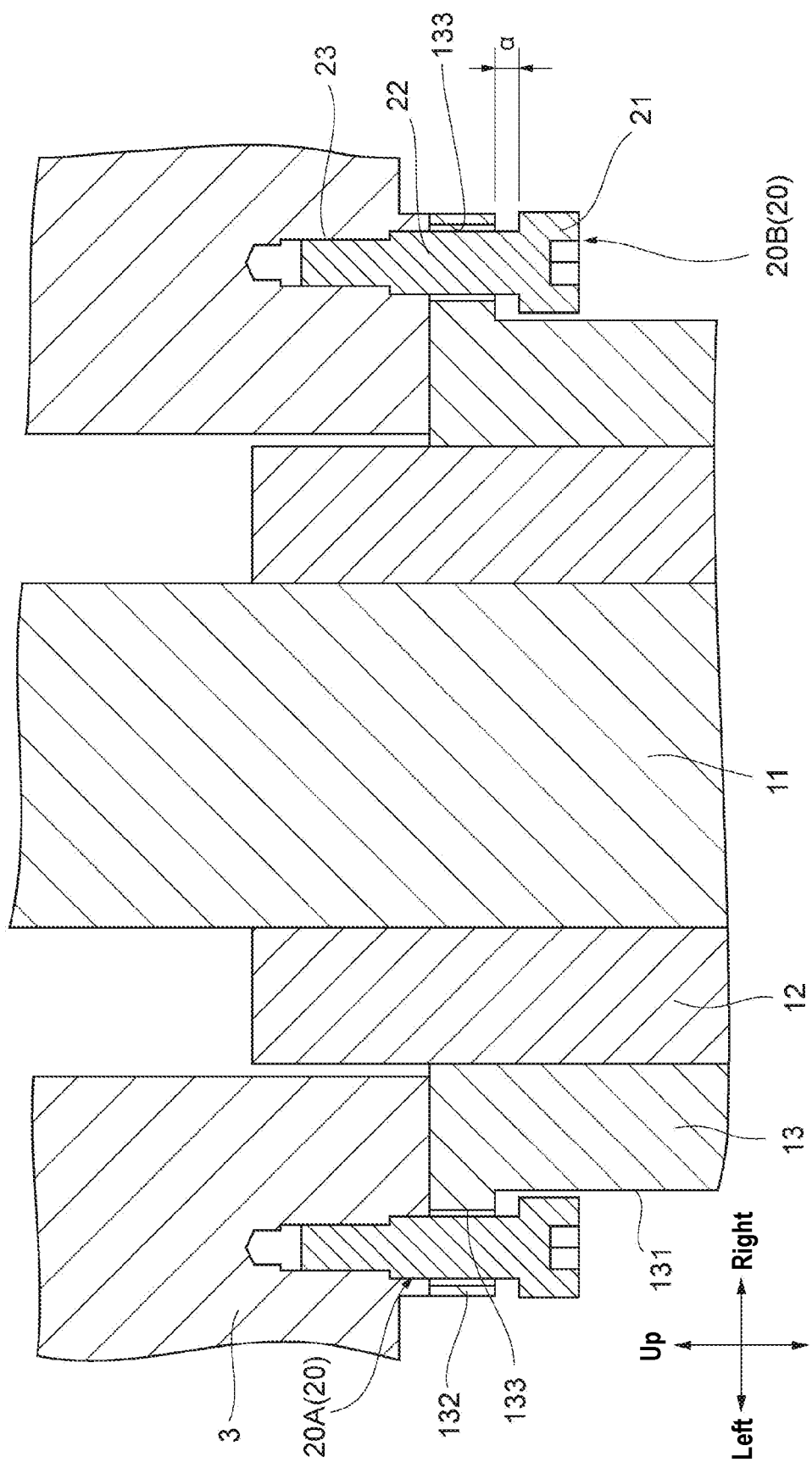
FIG. 3 is an enlarged cross-sectional view of the connecting structure shown in FIG. 1.

FIG. 3 is an enlarged cross-sectional view of the connecting structure 20 shown in FIG. 1. Multiple (e.g., eight) connecting tools (20A, 20B, . . . ) are attached to the first raising-lowering mechanism 10A. Similarly, multiple (e.g., eight) connecting tools (20A, 20B, . . . ) are attached to the other raising-lowering mechanisms 10B, 10C, and 10D. These connecting tools (20A, 20B, . . . ) are collectively referred to as a connecting structure 20.

As shown in FIG. 3, the ring 13 of the first raising-lowering mechanism 10A is provided with a cylindrical body 131, a flange portion 132 that protrudes radially from the upper end of the body 131, and a through hole 133 that penetrates the flange portion 132 in the extension direction (up and down direction) of the tie bar 4. Each of the connecting tools 20A, 20B, . . . is, for example, a tightening screw, and includes a threaded part 23 with a male thread formed to screw into the movable platen 3, a cylindrical portion 22 formed in a cylindrical shape with substantially the same diameter as the through hole 133 of the ring 13, and a head portion 21 formed with a diameter larger than the through hole 133.

The surface of the cylindrical portion 22 has a smooth cylindrical shape without unevenness and is in sliding contact with the inner circumference surface of the through hole 133, which has substantially the same diameter. There is a gap of length a between the seat surface of the head portion 21 of the connecting tools 20A and 20B and the lower surface of the flange portion 132 of the ring 13. In other words, the connecting tools 20A, 20B, . . . and the flange portion 132 configures a free shank structure having a movable region of a prescribed value $\alpha$.

As a result, the flange portion 132 and the head portion 21 of the connecting tool 20A never come into contact with each other, even if the first raising-lowering mechanism 10A raises or lowers the position of the movable platen 3 within the range of the prescribed value $\alpha$. On the other hand, the head portion 21 of the connecting tool 20A contacts the flange portion 132 to restrict further movement of the movable platen 3, even if the first raising-lowering mechanism 10A tries to move beyond the prescribed value $\alpha$.

According to the mold clamping device 1 of this embodiment configured as above, the connecting structure 20 restricts the movement of the movable platen 3 even if the difference $\beta$ exceeds the prescribed value $\alpha$. Thus, it is possible to prevent in advance the tie bar 4 from being damaged due to excessive tilting of the movable platen 3. The movable platen 3 may smoothly slide on the surface of the tie bar 4, even if the difference $\beta$ is maximum within the range of the prescribed value $\alpha$, so the mold clamping device 1 may be used without damaging the tie bar 4.

The nut 12 of the ball screw not only moves linearly in the extension direction of the shaft portion 11, but also receives a rotational load that tries to rotate around the shaft portion 11 due to friction with the shaft portion 11. In this embodiment, since multiple connecting tools 20A, 20B, . . . are provided around the axis of the first raising-lowering mechanism 10A, such rotational loads may be distributed.

The embodiment described above is intended to facilitate understanding of the present invention, and is not intended to limit the interpretation of the present invention. Each element included in the embodiment, as well as its arrangement, material, conditions, shape, size, etc., are not limited to those illustrated and may be changed as appropriate. Furthermore, it is possible to replace or combine the configurations shown in the different embodiments regionally.

For example, the stopper that restricts the movement of the movable platen 3 is not limited to the example shown in FIG. 3. It may be a hook or the like that engages when the height difference β between the first portion 3A and second portion 3B of the movable platen 3 reaches a prescribed value α.

The invention claimed is:

1. A mold clamping device, comprising:
   a movable platen that moves along a tie bar;
   a driving mechanism having a plurality of raising-lowering mechanisms, including a first raising-lowering mechanism and a second raising-lowering mechanism, and configured to be capable of introducing a difference so that a first portion of the movable platen corresponding to the first raising-lowering mechanism is set at a higher position or a lower position than a second portion of the movable platen corresponding to the second raising-lowering mechanism, the driving mechanism moving the movable platen; and
   a connecting structure, connecting the driving mechanism to the movable platen,
   wherein the connecting structure is configured as a stopper that restricts movement of the movable platen so that the difference does not become greater than a prescribed value,
   the connecting structure comprises a plurality of connecting tools attached to the first raising-lowering mechanism, and
   each of the plurality of connecting tools configures a free shank structure having a movable region of the prescribed value.

2. The mold clamping device according to claim 1, wherein the movable platen is configured to be able to smoothly slide on a surface of the tie bar in a state in which the difference is equal to the prescribed value.

3. The mold clamping device according to claim 2, wherein the driving mechanism comprises four of the raising-lowering mechanisms.

4. The mold clamping device according to claim 1, wherein the driving mechanism comprises four of the raising-lowering mechanisms.

* * * * *